Patented June 23, 1936

2,044,993

UNITED STATES PATENT OFFICE 2,044,993

VAT DYESTUFF DERIVED FROM 3,3'-DI-BROMO-INDANTHRENE AND METHOD OF MAKING SAME

Wilfred M. Murch, Midland, Mich., assignor to The Dow Chemical Company, Midland, Mich., a corporation of Michigan No Drawing. Application August 28, 1933, Serial No. 687,166

13 Claims. (Cl. 260—31)

This invention concerns new vat dyestuffs which have shades and general dyeing properties similar to those of certain well known chlorinated indanthrene dyestuffs, e. g. Indanthrene blue G. C. D., Indanthrene blue B. C. S., etc., as well as a method of making said new vat dyestuffs.

The above mentioned chlorinated indanthrene dyestuffs are costly to prepare, due to the fact that N-dihydro-anthraquinone-azine, from which they are prepared, is itself an expensive compound obtainable only in low yield by reacting 2-amino-anthraquinone with a fused mixture of caustic alkali and an oxidizing agent.

It is well known that 3,3'-dibromo-N-dihydro-anthraquinone-azine, which chemically is closely related to the aforementioned chlorinated indanthrene dyestuffs, can be prepared in good yield and at relatively low cost by brominating 2-amino-anthraquinone to form 1,3-dibromo-2-amino-anthraquinone and condensing two moles of the latter in the presence of copper chloride. 3,3'-dibromo-N-dihydro-anthraquinone-azine, hereinafter referred to as 3,3'-dibromo-indanthrene, dyes cotton to a greenish-blue color. It is, however, only sparingly soluble in alkaline hydrosulphite solutions and tends to crystallize on materials dyed therewith. Accordingly, it possesses little if any commercial utility as a vat dyestuff.

I have found that 3,3'-dibromo-indanthrene can be converted readily and at low cost into my new vat dyestuffs which can be employed satisfactorily in ordinary vat dyeing processes.

The new vat dyestuffs herein described are prepared by treating 3,3'-dibromo-indanthrene with sulphuric acid to introduce solubilizing groups, and treating the resultant material with an alkaline solution of an alkali metal hydrosulphite, whereby part or all of the substituted bromine is removed.

The vat dyestuffs so produced dye fabrics in shades varying from greenish-blue to reddish-blue which are fast to light and washing. The shade of blue produced by my dyestuffs is dependent upon the amount of bromine removed during the preparation thereof. As the percentage of bromine in the final product is lowered, the blue color of fabrics dyed therewith develops a deep reddish tint. My new dyestuffs are much more soluble in aqueous alkaline solutions of sodium hydrosulphite than is 3,3'-dibromo-indanthrene.

To the accomplishment of the foregoing and related ends, the invention consists in the method and new products hereinafter fully described and particularly pointed out in the claims, the following description and examples setting forth in detail only certain of the various ways in which the principle of the invention may be employed.

3,3'-dibromo-indanthrene is dissolved in concentrated, approximately 95 per cent, sulphuric acid and the solution is heated with agitation, in the presence or absence of boric acid, to between 100° and 175° C., preferably between 140° and 160° C., for about 1 to 3 hours. The resultant solution is poured into water, whereby a derivative of 3,3'-dibromo-indanthrene is precipitated. The mixture is filtered and the residue is washed free of acid with water.

The intermediate product so obtained is much more soluble in an aqueous solution of caustic alkali and sodium hydrosulphite than is the beginning material, 3,3'-dibromo-indanthrene. I have not ascertained the constitution of this intermediate product, but it is thought to be a hydroxyl derivative of 3,3'-dibromo-indanthrene. The bromine substituents in the 3,3'-dibromo-indanthrene are not removed to appreciable extent during the treatment with sulphuric acid.

The intermediate product is dissolved in a sufficient quantity, e. g. about 180 times its weight, of approximately 0.25 normal aqueous alkali metal hydroxide, preferably at a temperature between 60° and 70° C., to form a concentrated solution thereof. Potassium hydroxide is preferred for such purpose, since the potassium salt of the intermediate product is more soluble than is its sodium salt. However, sodium or other alkali metal hydroxides may be employed satisfactorily. The solution is then treated with an alkali metal hydrosulphite, e. g. $Na_2S_2O_4$, in amount representing about 1.5 or more times the dry weight of the intermediate product employed. The alkaline solution is stirred and maintained at between about 55° and 70° C., preferably between 60° and 70° C., during said operations.

By the treatment with hydrosulphite, bromine is removed from the aforementioned intermediate product. The amount of bromine so removed is dependent upon the length of time during which the treatment is continued. Since the shade of the resultant dye varies with the amount of bromine removed, as already stated, the treatment is continued until a sample of the solution, when cooled, and/or treated with sodium chloride, crystallizes out a dyestuff which dyes cotton to the desired shade of blue. The main body of reaction liquor is then cooled or otherwise treated to crystallize the vat dyestuff product. The latter is obtained as the alkali metal salt of its leuco form. Said leuco material can then be treated with oxygen or an oxygen-containing gas, e. g. air, in the usual way to form a stable and marketable blue dye.

The following examples describe certain ways in which the principle of my invention has been employed, but are not to be construed as limiting the invention.

Example 1

20 grams of 3,3'-dibromo-indanthrene was dissolved in 200 grams of 95 per cent sulphuric acid. The solution was stirred and heated to between 135° and 140° C. for 3 hours, after which it was poured into 3 liters of water, whereby a precipitate was formed. The precipitate was removed by filtration and washed free of acid with water. The paste-like material so obtained was of greenish-blue color. When reduced to its leuco form, the paste-like material was much more soluble than is the leuco form of 3,3'-dibromo-indanthrene. It dyes cotton to a greenish-blue color. Said paste-like material is my intermediate product referred to in the foregoing general description. When purified and dried it contains approximately 25.3 per cent of bromine.

Example 2

20 grams of 3,3'-dibromo-indanthrene which contained 24.4 per cent bromine, was dissolved in 200 grams of 95 per cent sulphuric acid. The solution was stirred and heated to between 140° and 145° C. for 1 hour, and was then poured into 2 liters of water, whereby a precipitate was formed. The precipitate was separated by filtration, washed free of acid with water, and was then thoroughly mixed with 3.5 liters of water heated to 60° C. The resultant suspension was treated with 50 grams of potassium hydroxide and 30 grams of sodium hydrosulphite, whereby a clear solution was formed. The solution was then stirred and maintained at between 60° and 65° C. for 2 hours. During said treatment a crystalline precipitate was at first formed which was redissolved as the operation was continued. The reacted liquor was cooled to about room temperature, whereby crystallization occurred. The crystals were separated by filtration and then washed with a dilute sodium hydroxide solution containing a trace of sodium hydrosulphite. The product so obtained was a salt of the dyestuff product in its leuco form. Said leuco product was oxidized by stirring it with sufficient water to form a thick slurry thereof and blowing air through the stirred slurry. The oxidized material was filtered from the mixture, washed free of alkali with water, and dried. The oxidized product contained 1.6 per cent of bromine. The dyestuff dyes cotton a bright reddish-blue shade, which has a deeper red tint than is produced when cotton is dyed with 3,3'-dibromo-indanthrene.

Example 3

30 grams of 3,3'-dibromo-indanthrene, which contained 24.5 per cent of bromine, was dissolved in 600 grams of 95 per cent sulphuric acid and the resultant solution was stirred and heated to between 135° and 140° C. for 4 hours. The solution was then cooled and poured into 3 liters of water to precipitate the intermediate product. The latter was removed by filtration, washed, and then mixed with 3.5 liters of water. 50 grams of potassium hydroxide and 30 grams of sodium hydrosulphite were added to the mixture and the latter was stirred and heated to 65° C., whereby a clear solution was formed. The solution was maintained at between 60° and 65° C., with continued stirring, for 2 hours. 50 grams of sodium hydroxide and 100 grams of sodium chloride were then added and the solution was cooled to 40° C., whereby a salt of the leuco dyestuff product was crystallized. The crystals were separated by filtration and washed with 2 liters of an aqueous solution containing 50 grams of sodium hydroxide, 150 grams of sodium chloride, and 5 grams of sodium hydrosulphite. The leuco dyestuff was oxidized with air through procedure similar to that described in Example 2, and dried. There was obtained a blue dye containing 9.2 per cent of bromine. The dyestuff dyes cotton a blue color of reddish tint deeper than that produced by 3,3'-dibromo-indanthrene, but not so deep as that produced by the product described in Example 2.

The quantities and concentrations of agents stated in the general description are those which can most conveniently be employed in practicing the invention. However, such quantities and concentrations of the agents may be varied widely without changing appreciably the nature and properties of the final dyestuffs.

In the claims the expression "concentrated sulphuric acid" refers to a between about 90 and 100 per cent sulphuric acid solution.

Other modes of applying the principle of my invention may be employed instead of those explained, change being made as regards the method herein disclosed, provided the steps or materials stated by any of the following claims or the equivalent of such stated steps or materials be employed.

I therefore particularly point out and distinctly claim as my invention:

1. In a method of making a vat dyestuff, the step which consists in heating 3,3'-dibromo-indanthrene with concentrated sulphuric acid to a temperature between about 100° and about 175° C.

2. In a method of making a dyestuff, the steps which consist in heating a solution of 3,3'-dibromo-indanthrene in concentrated sulphuric acid to a temperature between about 140° and about 160° C., and thereafter diluting the solution with water to precipitate a 3,3'-dibromo-indanthrene compound which is relatively soluble in an aqueous alkaline sodium hydrosulphite solution.

3. In a method of making a dyestuff, the steps which consist in heating a solution of 3,3'-dibromo-indanthrene and boric acid in concentrated sulphuric acid to a temperature between about 140° and 160° C., thereafter diluting the solution with water to precipitate a 3,3'-dibromo-indanthrene compound, which is relatively soluble in an aqueous alkaline sodium hydrosulphite solution, and separating the precipitate.

4. In a method of making a dyestuff, the steps which consist in reacting 3,3'-dibromo-indanthrene with concentrated sulphuric acid at a temperature between 100° and 175° C., diluting the reacted solution with water to precipitate a relatively soluble 3,3'-dibromo-indanthrene compound, separating the precipitate and thereafter reacting the latter with an alkali metal hydrosulphite at a temperature between about 55° and about 70° C. in the presence of alkali metal hydroxide and sufficient water to dissolve the reaction components.

5. In a method of making a dyestuff, the steps which consist in dissolving 3,3'-dibromo-indanthrene in concentrated sulphuric acid, heating the solution to a temperature between about 140° and about 160° C., thereafter diluting the solution with water to precipitate a relatively soluble 3,3'-dibromo-indanthrene compound and separating the precipitate, dissolving the latter with at least 1.5 times its weight of alkali metal hydrosulphite in an aqueous alkali metal hydroxide solution, heating the solution to a temperature between about 60° and about 70° C. until at least part of the bromine is removed from the aforesaid precipitated material, and then cooling the solution to crystallize the dyestuff product.

6. In a method of making a dyestuff, the steps which consist in dissolving 3,3'-dibromo-indanthrene in concentrated sulphuric acid, heating the solution to a temperature between about 140° and about 160° C., thereafter diluting the solution with water to precipitate a relatively soluble 3,3'-dibromo-indanthrene compound and separating the precipitate, dissolving the latter with at least 1.5 times its weight of sodium hydrosulphite at a temperature between about 60° and about 70° C. in about 0.25 normal aqueous alkali metal hydroxide solution to form a concentrated solution of said precipitated material, stirring and maintaining the solution at a temperature between about 60° and about 70° C. until at least part of the bromine is removed from the aforesaid precipitated material, cooling to crystallize the dyestuff product as a salt of its leuco form, separating the crystals, and oxidizing the latter to obtain a blue dye.

7. In a method of making a dyestuff, wherein 3,3'-dibromo-indanthrene is reacted with sulphuric acid at a temperature between 100° and 175° C. and the reacted solution is diluted with water to precipitate a relatively soluble 3,3'-dibromo-indanthrene compound, the step which consists in reacting said precipitate with alkali metal hydrosulphite at a temperature between about 60° and about 70° C., in the presence of alkali metal hydroxide and sufficient water to dissolve the reaction components, whereby at least part of the bromine is removed from the aforesaid precipitated material.

8. In a method of making a dyestuff, the steps which consist in reacting 3,3'-dibromo-indanthrene with sulphuric acid at a temperature between 100° and 175° C. and diluting the reacted solution with water, whereby a relatively soluble 3,3'-dibromo-indanthrene compound is precipitated, separating said precipitate and reacting the same with an aqueous solution of an alkali metal hydrosulphite and an alkali metal hydroxide at a temperature between about 60° and about 70° C., whereby a leuco dyestuff product containing bromine in percentage lower than was contained in the aforementioned precipitated material is formed, crystallizing and separating the leuco product, and oxidizing the same with an oxygen-containing gas to obtain a blue dye.

9. A vat dyestuff, preparable by reacting 3,3'-dibromo-indanthrene with concentrated sulphuric acid at a temperature between about 100° and about 175° C. to form a relatively soluble 3,3'-dibromo-indanthrene compound, separating the latter, and reacting the same with alkali metal hydrosulphite in the presence of water at a temperature between about 60° and about 70° C., and thereafter separating the dyestuff, the latter being a blue material which dyes cotton from an alkaline hydrosulphite vat to a color varying from greenish-blue to reddish-blue.

10. A vat dyestuff, preparable by reacting 3,3'-dibromo-indanthrene with concentrated sulphuric acid at a temperature between about 140° and about 160° C., diluting the reacted mixture with water to precipitate a relatively soluble 3,3'-dibromo-indanthrene compound separating said precipitate, reacting the latter at a temperature between about 60° and about 70° C. with alkali metal hydrosulphite in the presence of alkali metal hydroxide and sufficient water to dissolve the reaction components, and crystallizing the dyestuff product from the reacted mixture, said dyestuff being blue crystalline material which dyes cotton from an alkaline hydrosulphite vat to a color varying from greenish-blue to reddish-blue.

11. A vat dyestuff, preparable by reacting 3,3'-dibromo-indanthrene with concentrated sulphuric acid at a temperature between about 140° and about 160° C., diluting the reacted mixture with water to precipitate a relatively soluble 3,3'-dibromo-indanthrene compound, separating said precipitate, reacting the latter at a temperature between about 60° and about 70° C. with alkali metal hydrosulphite in the presence of sufficient approximately 0.25 normal aqueous alkali metal hydroxide solution to dissolve the reaction components, crystallizing the dyestuff product as a salt of its leuco form from the reacted mixture, and oxidizing said leuco dyestuff in the presence of water to form a powderlike blue dyestuff, which latter dyes cotton from an alkaline hydrosulphite vat to a color varying from greenish-blue to reddish-blue.

12. A vat dyestuff, preparable by reacting 3,3'-dibromo-indanthrene with concentrated sulphuric acid at a temperature between about 140° and about 160° C., diluting the reacted mixture with water to precipitate a 3,3'-dibromo-indanthrene derivative which is more soluble in an alkali metal hydrosulphite solution than is 3,3'-dibromo-indanthrene itself, separating the precipitate, reacting the latter at a temperature between about 60° and about 70° C. with alkali metal hydrosulphite in the presence of alkai metal hydroxide and sufficient water to dissolve the reaction components for a period of time sufficient to remove part but not all of the bromine from the dyestuff under treatment, and crystallizing the dyestuff product from the reacted mixture, said product being a blue crystalline material which dyes cotton from an alkaline hydrosulphite vat to a color varying from greenish-blue toward reddish-blue as the proportion of bromine therein is reduced.

13. A vat dyestuff, preparable by reacting 3,3'-dibromo-indanthrene with concentrated sulphuric acid at a temperature between about 140° and about 160° C., diluting the reacted mixture with water to precipitate a 3,3'-dibromo-indanthrene derivative which is more soluble in an alkali metal hydrosulphite solution than is 3,3'-dibromo-indanthrene itself, separating the precipitate, reacting the latter at a temperature between about 60° and about 70° C. with alkali metal hydrosulphite in the presence of sufficient approximately 0.25 normal aqueous alkali metal hydoxide solution to dissolve the reaction components for a period of time sufficient to remove part but not all of the bromine from the dyestuff under treatment, crystallizing the dyestuff product as a salt of its leuco form from the reaction mixture, and oxidizing said leuco dyestuff in the presence of water to form a blue dyestuff, which latter dyes cotton from an alkaline hydrosulphite vat to a color varying from greenish-blue toward reddish-blue as the proportion of bromine therein is reduced.

WILFRED M. MURCH.